United States Patent

Song et al.

(10) Patent No.: US 7,819,580 B2
(45) Date of Patent: Oct. 26, 2010

(54) ARM FRAME STRUCTURE AND SCAN APPARATUS HAVING THE SAME

(75) Inventors: Quanwei Song, Beijing (CN); Hui Meng, Beijing (CN)

(73) Assignee: Nuctech Company Limited, Beijing (CN)

( * ) Notice: Subject to any disclaimer, the term of this patent is extended or adjusted under 35 U.S.C. 154(b) by 13 days.

(21) Appl. No.: 12/342,504

(22) Filed: Dec. 23, 2008

(65) Prior Publication Data

US 2009/0168971 A1  Jul. 2, 2009

(30) Foreign Application Priority Data

Dec. 28, 2007  (CN) ........................ 2007 1 0304704

(51) Int. Cl.
*H01J 31/50* (2006.01)
(52) U.S. Cl. .......................... 378/189; 378/147; 378/57
(58) Field of Classification Search .................. 378/57, 378/145–153, 189, 193–198, 19
See application file for complete search history.

(56) References Cited

U.S. PATENT DOCUMENTS 6,904,122 B2 *  6/2005  Swift et al. .................... 378/41
6,922,461 B2 *  7/2005  Kang et al. .................... 378/57

* cited by examiner

*Primary Examiner*—Courtney Thomas
(74) *Attorney, Agent, or Firm*—Westman, Champlin & Kelly, P.A.

(57) ABSTRACT

Disclosed is an arm frame structure for a radiation imaging system, comprising a first upright column, a mounting frame, and first and second collimators mounted on said first upright column, and first and second detector devices. Said first and second collimators are arranged to be symmetrical with respect to a plane therebetween to divide a ray beam emitted from a radiation source into first and second beams emitted symmetrically. Said first and second detector devices are symmetrically mounted on the mounting frame with respect to the plane P and are arranged to be far away from said first and second collimators to receive the first and second beams, respectively. This invention further provides a radiation imaging system including the arm frame structure.

10 Claims, 4 Drawing Sheets

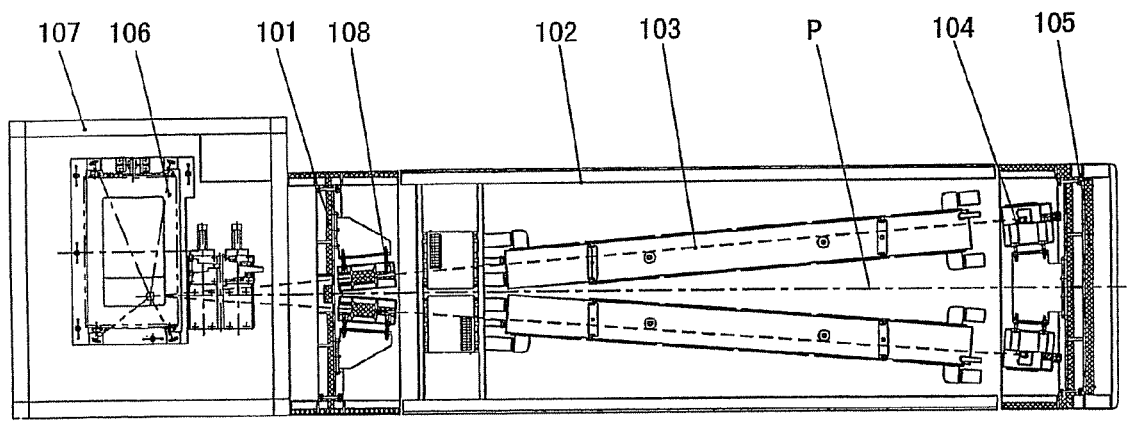
Fig.2
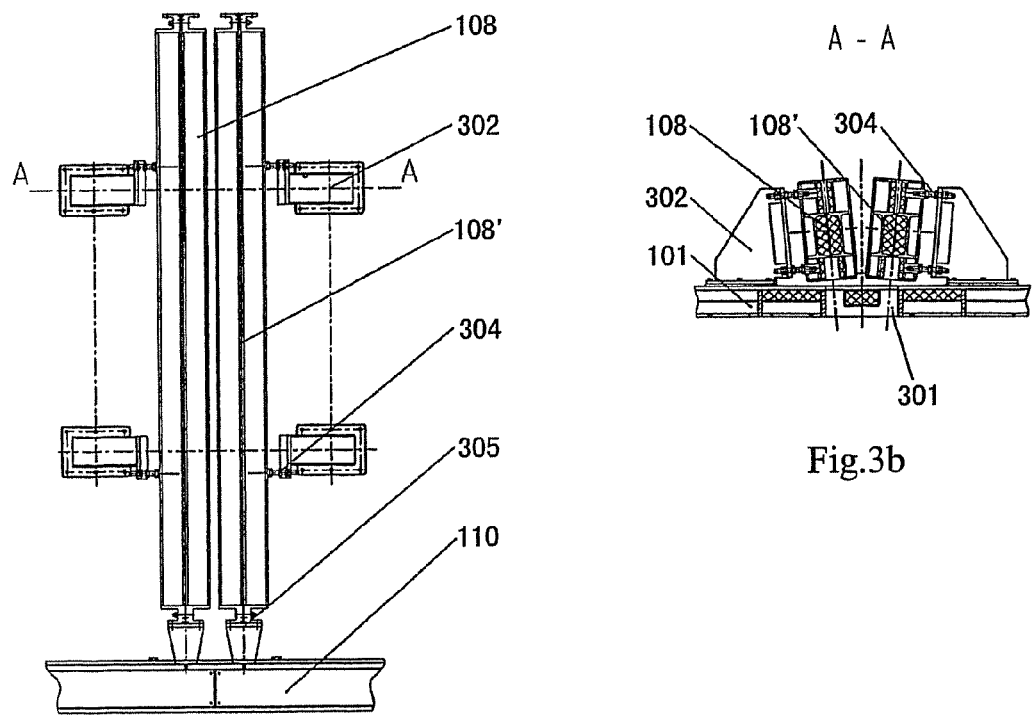
Fig.3a
Fig.3b

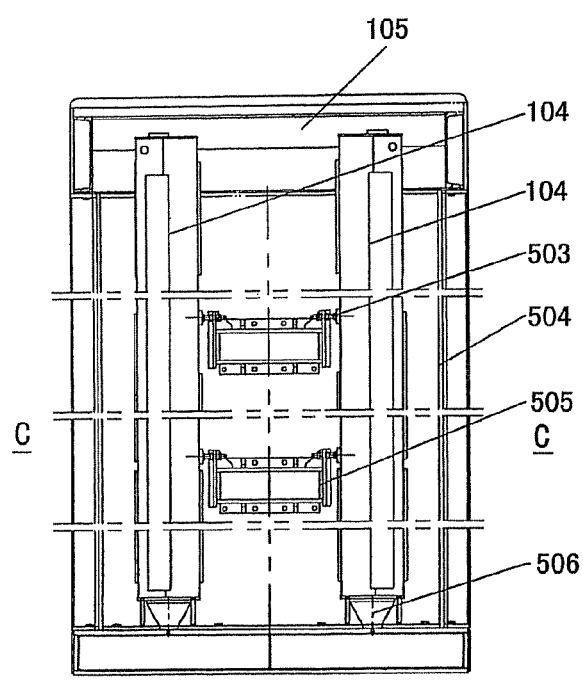
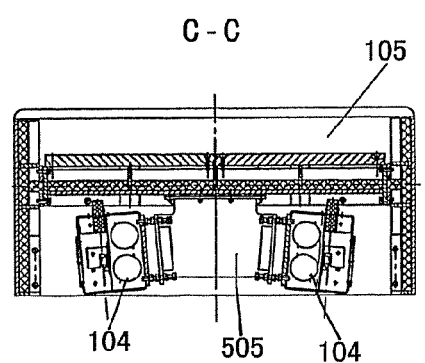
Fig.5a
Fig.5b

ARM FRAME STRUCTURE AND SCAN APPARATUS HAVING THE SAME

The present application claims priority of Chinese patent application Serial No. 200710304704.8, filed Dec. 28, 2007, the content of which is hereby incorporated by reference in its entirety.

FIELD OF THE INVENTION

The present invention relates to a scan radiation imaging apparatus of a radiation detection system for a large-sized object, and in particular, to an arm frame structure of a scan radiation imaging apparatus of a radiation detection system for a large-sized object.

DESCRIPTION OF THE RELATED ART

Radiation imaging technique, by the aid of penetrating capacity of X-ray with high energy, can penetrate the inside of an object without contacting the object to obtain the perspective image of the object. In the prior art, the operation principle of scan radiation imaging for large-sized object inspection is to employ X-rays emitted from a radiation source, and the X-rays pass through the object to be detected and are received by detectors to be converted into electrical signals. Then, the electrical signals are input into an image obtaining module through which the resulting image signal is input into a computer and is displayed by a displayer of the computer. In general, the perspective image formed by radiation imaging technique reflects projection of the whole object penetrated by X-ray beams without including any information along the depth direction. Thus, in a case where several objects are disposed along the incident direction of the beams, the resultant scanning image will be an overlapping image of all objects along the ray beam direction, which is disadvantageous of inspecting any article behind an object. In order to solve this problem, in the technical field of radiation imaging, a computerized tomography (CT) technique is proposed. The CT technique is a well-developed reestablishing technique. The defects of such CT technique are that equipments for implementing the CT technique have complicated structures and higher cost and can not inspect large-sized objects quickly and efficiently.

SUMMARY OF THE INVENTION

In order to overcome the above-mentioned defect existing in the conventional technique, the present invention provides an arm frame structure and a scan apparatus having the arm frame structure. The scan apparatus according to this invention can achieve scan radiation imaging with two viewing angles and quickly radiation detect a large-sized object.

In order to achieve the above object, the present invention provides an arm frame structure for a radiation imaging system, comprising: a first upright column; first and second collimators mounted on said first upright column, said first and second collimators being arranged to be symmetrical with respect to a plane therebetween to divide a ray beam emitted from a radiation source into first and second beams emitted symmetrically; a mounting frame; and first and second detector devices, said first and second detector devices being symmetrically mounted on the mounting frame with respect to the plane P and being arranged to be far away from said first and second collimators to receive the first and second beams, respectively.

The arm frame structure further comprises a first adjustment device. The first adjustment device is mounted on the first upright column to adjust the positions of the first and second collimators and an angle between the first and second collimators.

The arm frame structure further comprises two second adjustment devices. The second adjustment devices are mounted on said mounting frame to adjust the first and second detector devices, respectively, so that said first and second beams are vertically directed to said first and second detector devices, respectively.

In the arm frame structure, said mounting frame comprises a second upright column arranged to be far away from said first upright column, and a main beam arranged between the tops of said first and second upright columns. Said first and second detector devices comprise a pair of upright detector devices mounted on said second upright column, and a pair of lateral detector devices mounted under said main beam, so that said upright detector devices and said lateral detector devices receive said first and second beams in the vertical and horizontal directions.

In the arm frame structure, the pair of upright detector devices are connected to the second upright column via adjustment seats. Third adjustment devices are mounted between the upright detector devices and the adjustment seats. One or both of the pair of the upright detector devices are translated and rotated by adjusting said third adjustment devices, so that the detection surfaces of said upright detector devices directly face said first and second beams.

In the arm frame structure, the pair of lateral detector devices are connected to the main beam via a mounting seat. Fourth adjustment devices are provided on said mounting seat to adjust one or both of the lateral detector devices to be translated or swung, so that the detection surfaces of the lateral detector devices directly face said first and second beams.

The arm frame structure further comprises third adjustment devices mounted on the mounting frame. By adjusting said third adjustment devices, one or both of the pair of upright detector devices are adjusted to be translated and rotated, and/or one or both of the pair of lateral detector devices are adjusted to be translated and swung, so that the detection surfaces of the upright detector devices and/or the lateral detector devices directly face said first and second beams.

In the arm frame structure, ray detection arrays of said pair of upright detector devices are mounted to be higher than ray detection arrays on said pair of lateral detector devices, so that the rays directed to the intersection line formed by the measurement planes of the upright detector devices and the lateral detector devices can be detected.

In the arm frame structure, said mounting frame is mounted with a detector cooling system for cooling the first and second detector devices.

According to another aspect of this invention, a radiation imaging system is provided. The radiation imaging system comprises the above-mentioned arm frame structure and a ray source arranged to generate ray beams. Said ray source is disposed at an outer side of said first upright column to emit the ray beams toward said first and second collimators.

Compared with the prior art, the arm frame structure according to this invention has a simple structure and a lower cost. Further, the arm frame structure according to this invention can be obtained by modifying the conventional fixed-type container detection system, and also can be applied to fixed-type and movable type of large-sized container detection systems.

The radiation imaging system according to this invention divides a radiation beam emitted from an accelerator, as a radiation source, into two symmetrical X-rays. The receiving terminal of the radiation imaging system is a structure which includes two sets of detection arrays arranged with same symmetrical angles along the horizontal and vertical directions to receive two ray signals. In this way, 3-dimensional scan of an object to be detected can be achieved, so that accuracy of detecting 3-dimensional space information about the object to be detected can be achieved.

BRIEF DESCRIPTION OF THE DRAWINGS

FIG. 2 is a top view of an arm frame structure for a two-viewing angle scan apparatus according to this invention;

FIG. 3a is a front view of collimators and adjustment devices thereof according to this invention;

FIG. 3b is a cross-section view of the collimators and the adjustment devices thereof, taken along the line A-A shown in FIG. 3a, according to this invention;

FIG. 5a is front view of upright detector devices and adjustment devices thereof according to this invention; and FIG. 5b is a cross-section view of the upright detector devices and adjustment devices thereof, taken along the line C-C shown in FIG. 5a, according to this invention.

DETAILED DESCRIPTION OF THE PREFERRED EMBODIMENT

Next, the embodiments of this invention will be explained in conjunction with the drawings.

Figure 1:
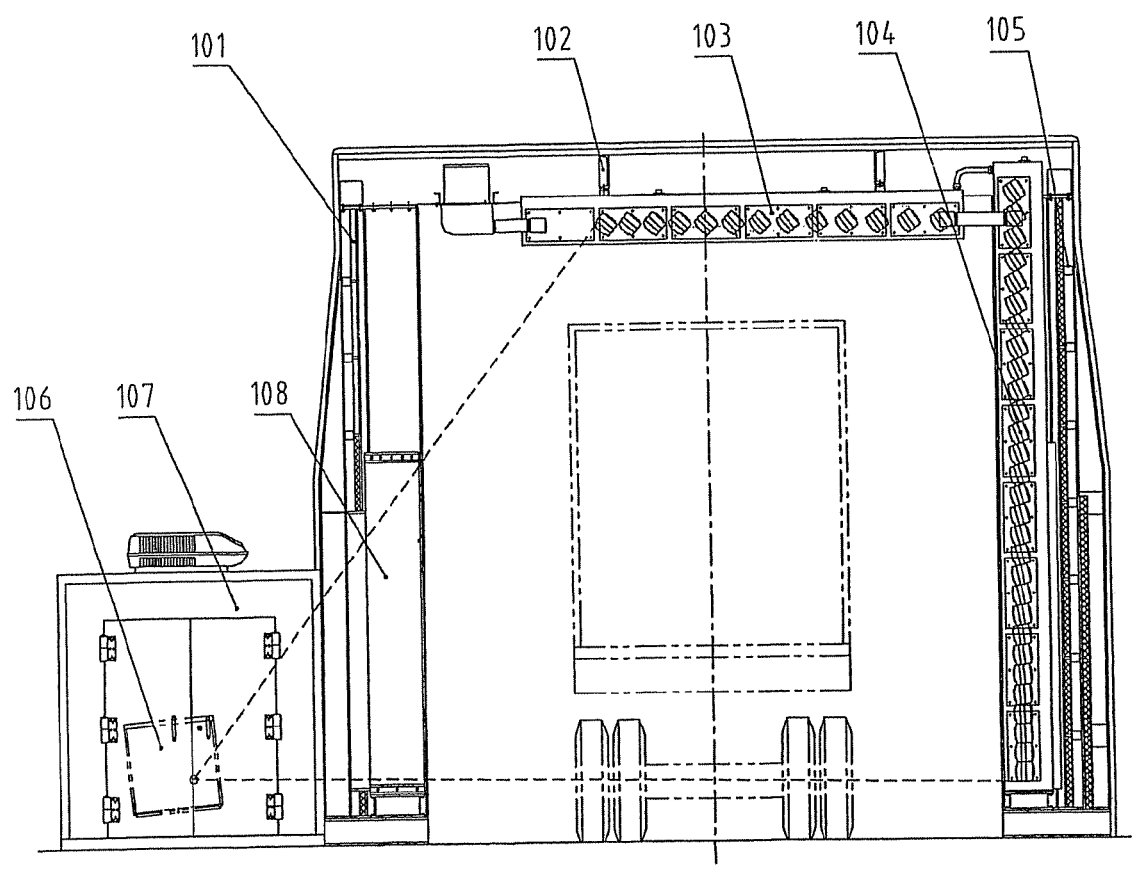
FIG. 1 is a front view of an arm frame structure for a two-viewing angle scan apparatus according to this invention.

FIGS. 1 and 2 are a front and top views of an arm frame structure for a two-viewing angle scan apparatus according to this invention, respectively. As shown in FIGS. 1 and 2, the arm frame structure for a two-viewing angle scan apparatus according this invention comprises a first upright column 101 provided on a base 110, and first and second collimators 108 and 108' mounted on the first upright column 101. The first and second collimators 108 and 108' are symmetrically arranged with respect to a plan P (seen in FIG. 2) therebetween to divide a ray beam emitted from a radiation source 106 into a first beam and a second beam emitted symmetrically. The arm frame structure also comprises a mounting frame including a second upright column 105 disposed far away from the first upright column 101. The arm frame structure further comprises a first detector device and a second detector device. The first and second detector devices are symmetrically mounted on the mounting frame with respect to the plane P to receive the first and second beams, respectively.

Specifically, in the arm frame structure according to this invention, the mounting frame also comprises a main beam 102 disposed between the tops of the first and second upright columns 101 and 105. In one embodiment, the first and second upright columns 101 and 105 are connected with the main beam 102 via bolts, so that an integral gantry structure is formed. The gantry structure defines a "Π"-shaped detecting region. An object to be detected, such as a container truck, a large-sized truck, and like, can pass through this detecting region. The gantry structure, as a frame of the arm frame structure for a scan apparatus of the present invention, provides a supporting and adjusting mechanism for the first and second collimators 108 and 108', and the first and second detector devices.

Further, the first and second detector devices comprise a pair of upright detector devices 104 mounted on the second upright column 105 and a pair of lateral detector devices 103 mounted under the main beam 102. The pair of upright detector devices 104 and the pair of lateral detector devices 103 are symmetrical with respect to the plane P, respectively, so that the first and second detector devices receive the first and second beams in the vertical and horizontal directions, respectively. Specifically, the upright detector devices 104 receive the first and second beams in the vertical direction, and the lateral detector devices 103 receive the first and second beams in the horizontal direction.

The main beam 102 and the lateral detector devices 103 are provided above the first upright column 101. The lateral detector devices 103 are mounted to and suspended from the main beam 102 which is employed as a main supporting structure. On the lateral detector devices 103, in two radiation regions to which the first and second beams, such as X-rays, direct and which form a certain angle with respect to each other, a plurality of ray detector arrays are uniformly mounted. Mounting frames for the respective ray detector arrays can be adjusted to ensure normal incidence of the first and second beams onto the detecting surfaces of the detector arrays, so that the detected signals of ray beams are strongest. In one embodiment, a frame for a detector cooling system is mounted on the main beam 102, and a cooling system is mounted on the frame to cool all detector arrays of the first and second detector devices. The whole main beam 102 system may be provided with a ceiling to protect the components in the whole detecting system.

In the two radiation regions to which the first and second beams direct and which form a certain angle with respect to each other, the second upright column 105 is symmetrically mounted with two upright detector devices 104. Both of the two upright detector devices 104 are uniformly mounted with ray detector arrays. Further, the upright detector devices 104 are mounted with adjustment devices similar to adjustment devices mounted on the first and second collimators, so that the upright detector devices 104 can be adjusted to ensure that the detection surfaces of the respective detector arrays provided on the upright detector devices 104 directly face the first and second beams, so that the signals of ray beams detected by the respective detector arrays will be strongest. In one exemplary embodiment, in order to entirely detect the first and second beams, the upper ends of the upright detector devices 104 are arranged to be higher than the lateral detector devices 103, so that the rays directed to the intersection line of the measurement plane of the upright detector devices and the lateral detector devices can be detected.

According to another aspect of this invention, an accelerator cabin 107 provided therein with an accelerator 106 may be mounted at an outer side of the first upright column 101 of the arm frame structure to form a two-viewing angle scan apparatus. In the scan apparatus according to this invention, the accelerator 106, as a radiation source, emits a ray beam, such as X-ray. The ray beam passes through the first and second collimators 108 and 108' and is divided into two symmetrical beams, i.e., first and second beams. The first and second beams pass through the object to be detected, such as a large-sized truck, and then are directed to two sets of lateral detector devices 103 and upright detector devices 104 arranged with same symmetrical angles and arranged in the horizontal and vertical directions, respectively. The plurality of detector arrays provided on the lateral detector devices 103 and the upright detector devices 104 receive the first and second beams in the vertical and horizontal directions and generate electrical signals, respectively. It can be understood that the arm frame structure according to this invention is provided with four detector devices. The four detector devices may have the same structure and the same operation principle, and the detector arrays on the four detector devices generate electrical signals according to the received beam signals.

According to this invention, all of the pairs of collimators, lateral detector devices, and upright detector devices are symmetrically arranged into two sets at two viewing angles and are provided with adjustment devices to ensure that the radiation directions of the first and second beams passing through the two collimators are perpendicular to the detection surfaces of the respective detector devices, i.e., the first and second beams are directed to the respective detector devices completely and vertically, so that the resulting electrical signals are strongest and truest. Two electrical signals based on the first and second beams are mathematically processed to obtain accurate 3-dimensional signals of the detected object. In this way, the problem of the prior art that the true shape and nature of the detected object can not be identified due to image overlap of the detected object when the object is scanned at a single viewing angle, is solved, thereby ensuring accuracy and higher efficiency of the whole scan detection system.

Next, the arm frame structure of this invention will be explained in details by referring to the drawings.

FIGS. 3*a* and 3*b* show the first and second collimators and adjustment devices thereof. As shown in FIGS. 3*a* and 3*b*, the first upright column 101 is mounted to the base 110 through lower seats 305. The first collimator 108 and the second collimator 108' are connected with the first upright column 101 through adjustment seats 302. The first upright column 101 is provided with a through hole 301 through which the ray beam from the accelerator 106 passes and is directed to the first collimator 108 and the second collimator 108'. For example, four adjustment devices, such as bolts 304, are mounted between the first and second collimators 108 and 108' and the adjustment seats 302. The first and second collimators 108 and 108' are translated and rotated by adjusting the bolts 304, so that the ray beam emitted from the accelerator 106 passes through slits of the first and second collimators 108 and 108' to form the first and second beams. The first and second beams are symmetrical with respect to the plane P between the first and second collimators 108 and 108'.

Figure 4A:
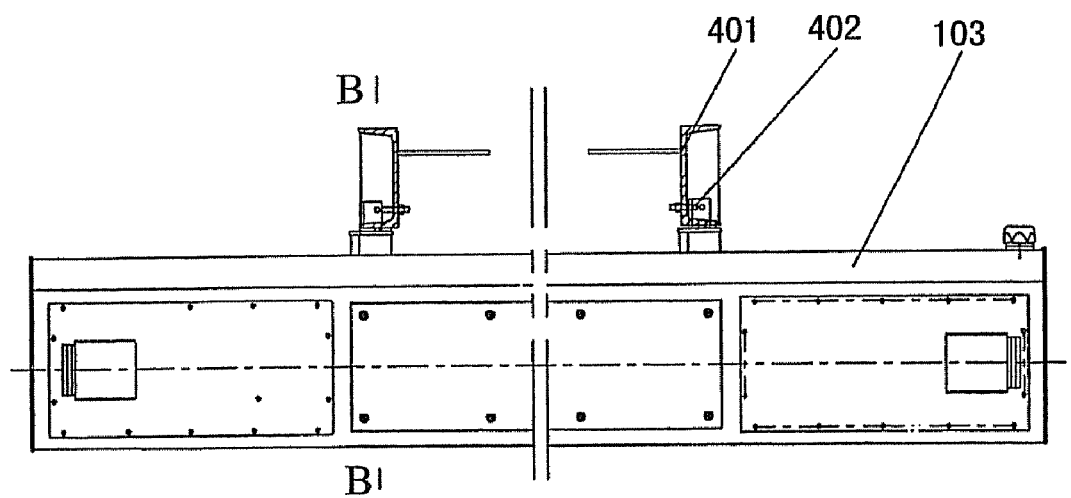
FIG. 4a is a front view of lateral detector devices and adjustment devices thereof according to this invention.
Figure 4B:
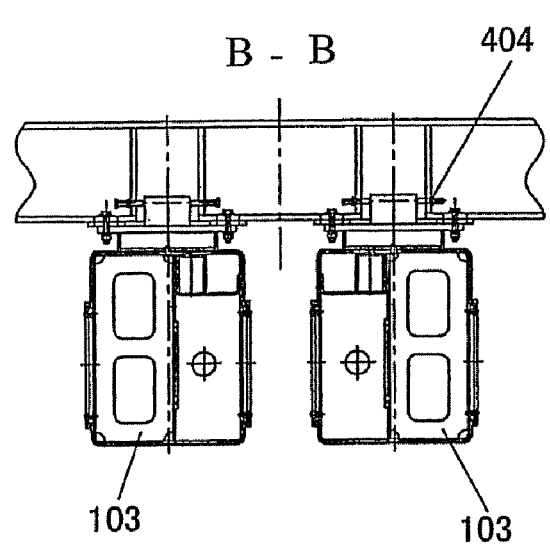
FIG. 4b is a cross-section view of the lateral detector devices and adjustment devices thereof, taken along the line B-B shown in FIG. 4a, according to this invention.

FIGS. 4*a* and 4*b* show the lateral detector devices and adjustment devices thereof according to the present invention. As shown in FIGS. 4*a* and 4*b*, a pair of lateral detector devices 103 are connected to the main beam 102 through a mounting seat 401. Adjustment devices, such as bolts 404, are provided on the mounting seat 401. One or both of the lateral detector devices 103 are translated or swung by adjusting the bolts 404, so that the first and second beams from the first and second collimators 108 and 108' are simultaneously received by the respective detector arrays of the lateral detector device 103. Further, longitudinal adjustment devices, such as bolts 402, are provided in the mounting seat 401. The relative position between the lateral detector device 103 and the upright detector device 104 is adjusted by adjusting the bolts 402 to ensure that there is no overlap or gap between the detector arrays of the lateral detector device 103 and the upright detector device 104, thereby ensuring imaging quality.

FIGS. 5*a* and 5*b* show the upright detector devices and adjustment devices thereof according to the present invention. As shown in FIGS. 5*a* and 5*b*, the second upright column 105 is mounted to the base 110 via a lower seat 506. A pair of upright detector devices 104 are connected to the second upright column 105 through an adjustment seat 505. For example, four adjustment devices, such as bolts 503, are mounted between the upright detector device 104 and the adjustment seat 505. One or both of the upright detector devices 104 are translated and rotated by adjusting the four bolts 503, so that the first and second beams passing through the first and second collimators 108 and 108' are received by the detector arrays of the upright detector devices 104, thereby ensuring imaging quality.

While an embodiment in which a pair of lateral detector devices 103 and a pair of upright detector devices 104 are mounted on the main beam 102 and the second upright column 104, respectively, is described above, this invention is not limited to this. In an alternatively exemplary embodiment, the pair of lateral detector devices 103 can be omitted, and only the pair of upright detector devices 104 are mounted on the second upright column 105. In this case, the accelerator 106 and the first and second collimators 108 and 108' can be mounted substantially on the middle portion of the first upright column 101, and scanning and detecting of the object to be detected also can be achieved.

While an embodiment in which the pair of lateral detector devices 103 and the pair of upright detector devices 104 are adjusted by using respective bolts as adjustment devices is described, this invention is not limited to this. At least one of the pair of lateral detector devices 103 and the pair of upright detector devices 104 also can be adjusted by using common adjustment devices, such as bolts, mounted on the mounting frame. By adjusting the common adjustment devices, one or both of the upright detector devices 104 are adjusted to be translated and rotated, or one or both of the lateral detector devices 103 are adjusted to be translated or swung, so that the detection surfaces of the upright detector devices 104 and/or the lateral detector devices 103 directly face the first and second beams.

With the arm frame structure for a scan radiation imaging apparatus of a radiation detection system for a large-sized object according to this invention, since a pair of collimators and a pair (s) of detector devices are symmetrically mounted, they together with the radiation source form a two-viewing angle radiation imaging apparatus. When the imaging apparatus according to this invention is applied to detect an object to be detected, such as a container truck, the contents overlapped within the object to be detected can be detected from two viewing angles and thus can be correctly identified, thereby finally ensuring correctness and high efficiency of the whole scan detection system.

Although exemplary embodiments of the present invention have been described, it will be appreciated by those skilled in the art that changes may be made in forms and details without departing from the spirit and scope of the present invention, the scope of which is defined in the appended claims and their equivalents.

What is claimed is:

1. An arm frame structure for a radiation imaging system, comprising:
   a first upright column;
   first and second collimators mounted on said first upright column, said first and second collimators being arranged to be symmetrical with respect to a plane (P) therebetween to divide a ray beam emitted from a radiation source into first and second beams emitted symmetrically;

a mounting frame;

first and second detector devices, said first and second detector devices being symmetrically mounted on the mounting frame with respect to the plane (P) and being arranged to be spaced apart from said first and second collimators to receive the first and second beams, respectively; and a first adjustment device, the first adjustment device being mounted on the first upright column to adjust the positions of the first and second collimators and an angle between the first and second collimators.

2. The arm frame structure according to claim 1, further comprising a first adjustment device, the first adjustment device being mounted on the first upright column to adjust the positions of the first and second collimators and an angle between the first and second collimators.

3. The arm frame structure according to claim 2, further comprising two second adjustment devices, said second adjustment devices being mounted on said mounting frame to adjust the first and second detector devices, respectively, so that said first and second beams are vertically directed to said first and second detector devices, respectively.

4. The arm frame structure according to claim 1, wherein said mounting frame comprises:

a second upright column arranged to be spaced apart from said first upright column, and a main beam arranged between the tops of said first and second upright columns;

said first and second detector devices comprise:

a pair of upright detector devices mounted on said second upright column; and a pair of lateral detector devices mounted under said main beam, so that said upright detector devices and said lateral detector devices receive said first and second beams in the vertical and horizontal directions.

5. The arm frame structure according to claim 4, wherein the pair of upright detector devices are connected to the second upright column via adjustment seats, third adjustment devices are mounted between the upright detector devices and the adjustment seats, and one or both of the pair of the upright detector devices are translated and rotated by adjusting said third adjustment devices, so that the detection surfaces of said upright detector devices directly face said first and second beams.

6. The arm frame structure according to claim 5, wherein the pair of lateral detector devices are connected to the main beam via a mounting seat, and fourth adjustment devices are provided between the lateral detector devices and said mounting seat to adjust one or both of the lateral detector devices to be translated or swung, so that the detection surfaces of the lateral detector devices directly face said first and second beams.

7. The arm frame structure according to claim 4, further comprising third adjustment devices mounted on the mounting frame, and by adjusting said third adjustment devices, one or both of the pair of upright detector devices are adjusted to be translated and rotated, and/or one or both of the pair of lateral detector devices are adjusted to be translated and swung, so that the detection surfaces of the upright detector devices and/or the lateral detector devices directly face said first and second beams.

8. The arm frame structure according to claim 4, wherein ray detection arrays of said pair of upright detector devices are mounted to be higher than ray detection arrays on said pair of lateral detector devices, so that the ray directed to the intersection line formed by the measurement planes of the upright detector devices and the lateral detector devices is detected.

9. The arm frame structure according to claim 1, wherein said mounting frame is mounted with a detector cooling system for cooling the first and second detector devices.

10. A radiation imaging system, comprising:

an arm frame structure comprising:

a first upright column;

first and second collimators mounted on said first upright column, said first and second collimators being arranged to be symmetrical with respect to a plane (P) therebetween to divide a ray beam emitted from a radiation source into first and second beams emitted symmetrically;

a mounting frame;

first and second detector devices, said first and second detector devices being symmetrically mounted on the mounting frame with respect to the plane (P) and being arranged to be spaced apart from said first and second collimators to receive the first and second beams, respectively;

a first adjustment device, the first adjustment device being mounted on the first upright column to adjust the positions of the first and second collimators and an angle between the first and second collimators; and a ray source arranged to generate ray beams, said ray source being disposed at an outer side of said first upright column to emit the ray beams toward said first and second collimators.

* * * * *